United States Patent [19]

Kubicek

[11] 4,412,981
[45] Nov. 1, 1983

[54] CONVERSION OF HYDROGEN SULFIDE TO SULFUR BY DIRECT OXIDATION

[75] Inventor: Donald H. Kubicek, Bartlesville, Okla.

[73] Assignee: Phillips Petroleum Company, Bartlesville, Okla.

[21] Appl. No.: 302,942

[22] Filed: Sep. 16, 1981

[51] Int. Cl.$^3$ .................. C01B 17/04; B01D 53/34
[52] U.S. Cl. ................... 423/573 R; 423/224; 423/226; 210/758; 208/235
[58] Field of Search .............. 423/224, 226, 571, 573; 208/235; 55/73; 210/758, 763

[56] References Cited

U.S. PATENT DOCUMENTS

| 2,556,836 | 6/1951 | Browder et al. | |
|---|---|---|---|
| 2,600,328 | 6/1952 | Riesenfeld et al. | 423/226 X |
| 2,972,522 | 2/1961 | Urban . | |
| 3,097,926 | 7/1963 | Nickiin et al. | |
| 3,099,536 | 7/1963 | Urban et al. | 423/575 |
| 3,103,411 | 9/1963 | Fuchs | 423/224 X |
| 3,516,793 | 6/1970 | Renault | 423/573 |
| 3,914,309 | 10/1975 | Beazley | 423/573 |
| 4,313,916 | 2/1982 | Jones et al. | 423/226 |

FOREIGN PATENT DOCUMENTS

| 1080530 | 7/1957 | Fed. Rep. of Germany | 423/573 |
|---|---|---|---|
| 1492797 | 8/1967 | France | 423/573 |
| 597655 | 5/1945 | United Kingdom | 423/571 |
| 841610 | 7/1960 | United Kingdom | 423/573 |
| 1182255 | 2/1970 | United Kingdom | 423/573 |

*Primary Examiner*—Earl C. Thomas

[57] ABSTRACT

In a process wherein hydrogen sulfide is converted to elemental sulfur in the presence of oxygen, an improvement is made by employing an alcoholic solution of an alkali metal hydroxide, free of iron-group salts or other heterogeneous catalysts. High yields of pure sulfur are obtained from such reactions begun at room temperature, without a requirement for heterogeneous catalysts or troublesome intermediates such as sulfur dioxide.

9 Claims, No Drawings

CONVERSION OF HYDROGEN SULFIDE TO SULFUR BY DIRECT OXIDATION

BACKGROUND OF THE INVENTION

Hydrogen sulfide is a material commonly available from many sources and potentially useful when converted to other materials such as elemental sulfur or sulfuric acid. However, recovery of hydrogen sulfide from various sources for conversion is frequently difficult or expensive. For example, in the refining of petroleum, hydrogen sulfide is produced in large quantities as an undesirable dangerous contaminant mixed with larger quantities of other materials. Often hydrogen sulfide thus produced is passed into the atmosphere as waste material, since the cost of recovery is not warranted by the value of the product recovered. However, in populated areas such disposal of hydrogen sulfide represents a nuisance, and expensive recovery methods must be employed.

In some cases hydrogen sulfide must be removed from various process streams to prevent the contamination of those streams. For example, the presence of sulfur compounds in gasoline is detrimental, since they have a suppressing effect on octane number and cause the gasoline to be corrosive, unstable and sour. In some process streams hydrogen sulfide must be removed to prevent its detrimental effect upon later employed catalysts. For example, in catalytically reforming a gasoline fraction, a net hydrogen production is realized which is at least partially recirculated to the reforming zone to saturate olefinic material and to prevent carbonization of the catalyst. It is desirable for the recycled hydrogen-containing stream to contain as little hydrogen sulfide as possible, thus preventing its undesirable effects upon the catalyst. Thus, it is often necessary and always desirable to remove hydrogen sulfide from this and similar streams. The present invention provides improved means for recovering valuable sulfur as a by-product from hydrogen sulfide, thus providing an economical and efficient means for removing hydrogen sulfide from other materials even though it is present in relatively low concentrations.

The challenge of effective and economical recovery and conversion of hydrogen sulfide from its various sources has been approached by various means in the prior art. For instance, U.S. Pat. No. 2,972,522 describes the production of sulfur from hydrogen sulfide by the absorption of gaseous hydrogen sulfide in an ammoniacal or amine solution and oxidation with oxygen in the presence of a heterogeneous catalyst such as cobalt. U.S. Pat. No. 3,097,926 describes a process for the removal of hydrogen sulfide from gas or liquid streams by washing with aqueous alkali metal hydroxides containing a cobalt salt and a chelating agent in the presence of free oxygen. Hydrogen sulfide is thus converted to elemental sulfur. In U.S. Pat. No. 2,556,836 a process is described whereby sour petroleum distillates free from hydrogen sulfide are sweetened by treatment with an alcoholic alkali metal hydroxide in the presence of a mild oxidizing agent such as oxygen. At temperatures of 60° to 200° F., mercaptans are converted to disulfides. Hydrogen sulfide and other acidic compounds are reported as causing the alkali metal hydroxide catalyst to quickly become depleted in activity.

SUMMARY OF INVENTION

An object of this invention is the removal of hydrogen sulfide from gases comprising hydrogen sulfide, or containing hydrogen sulfide, or containing hydrogen sulfide in any proportion in conjunction with other gases such as carbon dioxide, carbon monoxide, hydrogen, aliphatic and aromatic hydrocarbons, oxygen and nitrogen, and from liquid or gaseous hydrocarbon mixtures. A further object of this invention is the treating, or "sweetening" of sour petroleum distillates. Another object is the production of sulfur from hydrogen sulfide.

OBJECTS

This invention provides an improved means for the removal of hydrogen sulfide from gaseous or liquid process streams or other sources and its conversion to elemental sulfur without the need for heterogeneous catalysts or the production of undesirable intermediates such as sulfur dioxide.

Generally, the process of this invention involves contacting a hydrogen sulfide-containing stream, whether gaseous or liquid, with an alcoholic solution of an alkali metal or alkaline earth metal hydroxide, essentially free of iron group salts. The reaction of this invention is carried out substantially free of iron group catalyst materials, particularly free of cobalt salts; this requires that not more than inconsequential amounts of such materials are present in the reaction mixture. By simultaneously or subsequently adding oxygen or air to the resulting solution, the hydrogen sulfide is converted to elemental sulfur. The reaction is exothermic, beginning at temperatures as low as 25° C. By carrying on the reaction without heterogeneous catalysts, an essentially pure conversion product of elemental sulfur may be recovered simply and economically.

The materials required to be absent (except for possible small, inconsequential amounts) from the system of this invention are compounds of group VIII of the Periodic System; in particular, Fe, Co, Ni and their salts.

The reaction of this invention may be commenced under mild conditions such as room temperature (25° C.) and atmospheric pressure. Since the reaction is exothermic, the system temperature will normally increase, with about 100° C. being the practical maximum and 15° C. to 60° C. the preferred range. Possible feedstocks can comprise hydrogen sulfide in essentially pure form, or in liquid or gaseous mixtures of aliphatic and aromatic hydrocarbons, carbon dioxide, carbon monoxide, hydrogen, oxygen and nitrogen. The reaction is most effective when oxygen is used in a nearly pure state, but depending upon the feedstock, the partial pressure of oxygen can be controlled to avoid mixtures within the explosive limits of hydrogen sulfide or other flammable feedstock components. With closed reaction systems, the reaction may be considered complete when oxygen is no longer absorbed by the system. In other systems, flow rates must be determined empirically, depending upon partial pressures of oxygen and hydrogen sulfide and availability of base, so that the reactants are in contact for a sufficient time to produce optimum conversion. The alkali metal or alkaline earth metal hydroxide is used as a catalyst, thus no particular pH range is specified.

There are four essential ingredients used in the process of this invention, namely, hydrogen sulfide ($H_2S$), an alkali or alkaline earth metal hydroxide, a hydroxyl-containing liquid, and oxygen. Variations within each ingredient type are listed in the following paragraphs.

Hydroxyl-Containing Liquids

Hydroxyl-containing liquids are those materials represented by the formula $$R(OH)_n$$

where R equals hydrogen or any alkyl or alkylene radical having one to six carbon atoms; and n equals the valence of R, being 1 or 2. Examples of materials that can be used include

| | |
|---|---|
| water | methyl alcohol |
| ethyl alcohol | n-propyl alcohol |
| isopropyl alcohol | butanol |
| pentanol | hexanol |
| ethylene glycol | propylene glycol |
| 1,4-butanediol | 1,6-hexanediol | and mixtures of two or more of these compounds.

The hydroxy-containing liquid is a contact medium for the alkali metal or alkaline earth metal hydroxide, $H_2S$ and oxygen. Therefore, the hydroxy-containing liquid preferably dissolves or at least partially dissolves the ingredients previously mentioned.

Base

The reaction system of this invention comprises a base, which may be a metal hydroxide, ammonium hydroxide $NH_4OH$ or an amine. Mixtures of two or more bases can be used.

Metal hydroxides useful in this invention are those materials represented by the formula $$M(OH)_n$$

wherein M is any alkali or alkaline earth metal such as those listed in Groups IA and IIA of the Periodic Table, with n equal to one or two depending upon the valence of M. For example, materials which correspond to the above formula are:

| | |
|---|---|
| Group IA | lithium hydroxide, LiOH |
| | sodium hydroxide, NaOH |
| | potassium hydroxide, KOH |
| | rubidium hydroxide, RbOH |
| | cesium hydroxide, CsOH |
| Group IIA | beryllium hydroxide, Be(OH)$_2$ |
| | magnesium hydroxide, Mg(OH)$_2$ |
| | calcium hydroxide, Ca(OH)$_2$ |
| | strontium hydroxide, Sr(OH)$_2$ |
| | barium hydroxide, Ba(OH)$_2$ |

Group IA metal hydroxides are preferred because of their greater solubility in the reaction media.

Another group of bases which may be employed include amines, such as, for example, the following:
Ammonium hydroxide, $NH_4OH$
Ethyl amine
Methyl amine
Ethanol amine
Tetramethylethylenediamine
Triethylene diamine The preferred amines generally have 1 to 6 carbon atoms and 1 to 2 amine groups.

The metal hydroxide is generally absorbed directly in the hydroxyl-containing medium, in concentrations ranging from approximately 0.1 weight percent to 10 weight percent based on the amount of hydroxyl containing medium. The concentration should be limited to maintain the system as a liquid solution of low to moderate viscosity.

Solvents

Solvents are not necessarily required in this invention but if used can be any inert aliphatic, cycloaliphatic or aromatic hydrocarbon having from about five to about nine carbon atoms. Such materials include, for example, but are not limited to, the following:

| | |
|---|---|
| pentane | hexane |
| heptane | octane |
| cyclopentane | methylcyclopentane |
| cyclohexane | benzene |
| toluene | xylene | and mixtures of two or more of these solvents.

The prerequisite for a solvent is that it be capable of dissolving or partially dissolving the ingredients of the invention, particularly the hydroxyl-containing liquid and the metal hydroxide. Under some conditions, the use of certain solvents can increase the conversion rate or yield of sulfur from $H_2S$.

Oxygen

Free oxygen containing gases such as air or oxygen can be used in this invention. When the reaction is conducted on a batch scale pure oxygen is preferred but its use is preferred as a partial gas along with variable amounts of nitrogen or other inert gases and $H_2S$. Partial use of oxygen is preferred so as to avoid explosive limits of oxygen with $H_2S$ or other gases involved in the process.

Ingredient Ratios

The appropriate molar ratio of $H_2S:M(OH)_n$ varies widely depending on the system, grams of sulfur per gram of base desired, partial oxygen pressure, etc. The preferred molar ratio range of $H_2S:M(OH)_n$ is from about 100:1 to 5000:1, although under certain conditions a ratio less than 100:1 could be used.

For the complete conversion of $H_2S$ to sulfur, the molar ratio of $H_2S:O_2$ can be about 2:1, but starting and process ratios may be varied to optimize results for particular batch or continuous processes. When adding oxygen to a batch process, when oxygen ceases to be absorbed by the system the reaction should be substantially complete. The weight ratio of solvent to reactants can be in the range from about 1:4 to 4:1. The content of $H_2S$ in a gaseous feedstock can range from about 0.1 weight percent up to essentially 100%, resulting in a maximum proportion in the reaction system of about 75 weight percent. For liquid feedstocks, the $H_2S$ content can range from about 0.1 weight percent to saturated solutions.

Reaction System

The reaction can be operated on either a batch or continuous scale. When operated on a continuous scale, pure oxygen or air can be employed as the oxidant. When operated on a batch scale, pure oxygen alone is preferred to avoid excessive unreacted nitrogen from air.

The process of the present invention may be effected in any suitable apparatus which may be specially adapted for the particular hydrogen sulfide source to be treated. For example, when a stream having a high hydrogen sulfide concentration is employed the process may be effected simply by absorbing both the hydrogen sulfide and oxygen in a pool of solvent for reaction. When the source of hydrogen sulfide is a process stream which is to be purified, the solvent may be used in a separate zone as an absorbing medium to remove hydrogen sulfide from the main stream, thereby purifying that stream. The hydrogen sulfide-rich solvent may then be passed to a separate reaction zone where it is converted by contact with oxygen to sulfur thus regenerating the solvent for further use in purifying the process stream. The process may be effected using air or using oxygen by itself or mixed with other gases, and may be effected by simply absorbing the reactants in a pool of solvent or in a slurry or suspension operation wherein the reactants pass concurrently or countercurrently with the moving solvent and catalyst. The reaction may be effected in a countercurrent, multi-stage manner when complete recovery and conversion are desired and when so effected, any degree of recovery and conversion may be obtained by employing a sufficient number of stages.

Following are several examples which illustrate the operability and utility of the present invention and are intended to be illustrative rather than limiting on its broad scope.

EXAMPLE I

This example is an inventive run illustrating that hydrogen sulfide is readily converted to elemental sulfur in high recoveries when treated with an alcoholic solution of an alkali metal hydroxide and elemental oxygen. The procedure used was as follows: Into a 300 mL stainless steel stirred autoclave was charged 50 mL methyl alcohol, 1 gram sodium hydroxide and 40 grams (1.176 moles) hydrogen sulfide. The reactor pressure was 210 psig after charging H$_2$S. Nitrogen was then added to provide a total reactor pressure of 280 psig followed by 20 psig oxygen for a total reactor pressure of 300 psig. Over the next 2 hours the temperature rose, without any heat input, from 24° C. (76° F.) to 54° C. (130° F.). During this time depleted oxygen was replaced at 20 and 50 psig increments until no more oxygen was consumed. The reactor was cooled and the contents filtered to give 35.4 grams (94.1 weight percent yield) of elemental sulfur.

EXAMPLE II

This example describes additional inventive runs. The procedure described in Example I was repeated using various proportions of ingredients, solvent and a cobalt catalyst (in one run). These results are listed in Table I, wherein it is shown that high yields of elemental sulfur are obtained when H$_2$S is treated with oxygen in the presence of an alkali metal hydroxide-alcohol mixture.

TABLE I

| | | | | | | | | | | | | | |
|---|---|---|---|---|---|---|---|---|---|---|---|---|---|
| | | colspan="9" | CONVERSION OF H$_2$S TO ELEMENTAL SULFUR | | | | | | | | | | |
| | | colspan="5" | Ingredients | | | | | colspan="4" | Reaction Conditions | | | | |
| Run No. | MeOH, mL | colspan="2" | NaOH | colspan="2" | H$_2$S | H$_2$S:NaOH Mole Ratio | Other | Temp., °C. | colspan="3" | Pressure, psig | Time, hrs. | colspan="2" | Sulfur |
| | | g | moles | g | moles | | | | H$_2$S | N$_2$ | O$_2$ | | g | Wt. % Yield |
| 1 | 50 | 1 | .0029 | 40 | 1.174 | 405:1 | — | 24–54 | 210 | 70 | 20 | 2 | 35.4 | 94.1 |
| 2 | 75 | 1 | .0029 | 37 | 1.086 | 374:1 | — | 15–59 | 120 | 80 | 50 | .95 | 33 | 94.8 |
| 3 | 75 | 1 | .0029 | 35 | 1.027 | 354:1 | 10 mL n-hexane | 20–52 | 130 | 70 | 50 | 1.1 | 31.8 | 96.6 |
| 4 | 75 | 1 | .0029 | 30 | 0.88 | 303:1 | cobalt$^a$ | 19–52 | 120 | 80 | 50 | .90 | 25 | 88.6 |
| 5 | 75 | 1 | .0029 | 65 | 1.90 | 655:1 | — | 14–52 | 160 | 60 | 30 | 4 | 58 | 94.7 |
| 6 | 75 | 0.5 | .0015 | 60 | 1.76 | 1173:1 | — | 14–26 | 150 | 50 | 50 | 2.2 | 31.1 | 55.1 |

$^a$1 Drop of liquid cobalt 2-ethyl hexanoate

The data appear to suggest the following:
(1) A hydrocarbon solvent enhances yield (Run 3) although the time to complete the run is slightly longer than usual.
(2) A cobalt catalyst (Run 4) slightly reduces sulfur yield and, therefore, is neither necessary nor desirable, especially since the remnants of the catalyst would require removal from the sulfur product.
(3) Increasing the mole ratio of H$_2$S to alkali metal hydroxide beyond about 1000:1 (Run 6) reduces the absolute yield of elemental sulfur. However, Run 6 shows good results when the grams yield of product obtained per gram of alkali metal hydroxide used is considered; in this run, the yield of sulfur obtained per gram of sodium hydroxide employed was the highest of all the runs.

Various modifications and alterations of this invention will become apparent to those skilled in the art without departing from the scope and spirit of this invention. The foregoing discussion and examples merely illustrate preferred embodiments of this invention and do not unduly limit the same.

I claim:
1. A process for the absorption and subsequent conversion of hydrogen sulfide to sulfur by direct oxidation, comprising contacting a gaseous or liquid feedstock containing hydrogen sulfide with a reaction system consisting essentially of
  (a) a hydroxyl-containing liquid or liquids represented by the formula ROH, where R equals hydrogen or an alkyl or alkylene radical having from 1 to 6 carbon atoms or a mixture of two or more of said liquids;
  (b) at least one base, selected from the group consisting of (1) ammonium hydroxide, (2) amines having from 1 to about 6 carbon atoms and 1 or 2 amine groups, and (3) metal hydroxides represented by the formula M(OH)$_n$, where M is an alkali or alkaline earth metal and n is 1 or 2 depending upon the valence of M, and
  (c) free oxygen introduced as an oxidant by using air, a mixture of air and oxygen, or a mixture of oxygen with inert gases, wherein said reaction is carried out in the absence of ions or particles of metals of the iron group, and said reaction optionally is carried out in the presence of an inert hydrocarbon solvent.

2. A process in accordance with claim 1 in which the hydroxyl-containing liquid used is methyl, ethyl, or propyl alcohol.

3. A process in accordance with claim 1 in which the hydrocarbon solvent is n-hexane.

4. A process in accordance with claim 1 which starts at a temperature of approximately 25° C.

5. A process in accordance with claim 1 in which the base is $M(OH)_n$ and the equivalent molar concentration ratio of $H_2S$ to $M(OH)_n$ is maintained in the range from about 100:1 to 5000:1.

6. A process in accordance with claim 1 in which the reaction is carried on as a continuous process, with reactants and solvents added, and product removed to maintain concentrations within acceptable limits.

7. A process in accordance with claim 1 in which the gaseous feedstock is selected from the group of nearly pure hydrogen sulfide, and hydrogen sulfide together with other gases in proportions ranging from about 0.1 weight percent $H_2S$ up to nearly 100 percent $H_2S$, said other gases being selected from the group consisting of carbon dioxide, carbon monoxide, hydrogen, aliphatic and aromatic hydrocarbons, oxygen and nitrogen and mixtures of two or more of such gases.

8. A process in accordance with claim 1 in which a liquid feedstock is used containing hydrogen sulfide in proportions ranging from about 0.1 weight percent up to saturated concentrations in liquid solvents selected from the group of water, alcohols, aliphatic and aromatic hydrocarbons, which are inert to hydrogen sulfide and the other reactants.

9. A process for the absorption, and subsequent conversion of hydrogen sulfide to sulfur by direct oxidation, comprising contacting a gaseous or liquid feedstock containing hydrogen sulfide with a reaction system consisting essentially of
  (a) at least one hydroxyl-containing liquid represented by the formula ROH, where R represents hydrogen or an alkyl or alkylene radical having from 1 to six carbon atoms;
  (b) at least one base, selected from the group consisting of ammonium hydroxide and metal hydroxides represented by the formula $M(OH)_n$, where M is an alkali or alkaline earth metal and n is 1 or 2 depending upon the valence of M, and
  (c) free oxygen introduced as an oxidant by using air, a mixture of air and oxygen, or a mixture of oxygen with inert gases, wherein said reaction is carried out in the absence of ions or particles of metals of the iron group, and said reaction optionally is carried out in the presence of an inert hydrocarbon solvent.

* * * * *